(12) United States Patent
Keller et al.

(10) Patent No.: US 11,949,678 B2
(45) Date of Patent: Apr. 2, 2024

(54) AUTOMATED BOT BLOCKING

(71) Applicant: Kayak Software Corporation, Stamford, CT (US)

(72) Inventors: Matthias Günther Keller, Winchester, MA (US); Algirdas Rascius, Kaunas (LT); Alexei Borisovich Fedotov, Natick, MA (US); Darius Prakaitis, Kaunas (LT)

(73) Assignee: KAYAK Software Corporation, Stamford, CT (US)

( * ) Notice: Subject to any disclaimer, the term of this patent is extended or adjusted under 35 U.S.C. 154(b) by 286 days.

(21) Appl. No.: 17/217,733

(22) Filed: Mar. 30, 2021

(65) Prior Publication Data
US 2022/0321563 A1 Oct. 6, 2022

(51) Int. Cl.
H04L 9/00 (2022.01)
G06N 5/04 (2023.01)
H04L 9/40 (2022.01)

(52) U.S. Cl.
CPC .............. H04L 63/10 (2013.01); G06N 5/04 (2013.01); H04L 63/1416 (2013.01); H04L 63/107 (2013.01); H04L 63/108 (2013.01); H04L 2463/144 (2013.01)

(58) Field of Classification Search
None
See application file for complete search history.

(56) References Cited

U.S. PATENT DOCUMENTS

| | | | |
|---|---|---|---|
| 10,178,114 B2 | 1/2019 | Safruti et al. | |
| 10,270,792 B1 | 4/2019 | Shemesh | |
| 10,447,711 B2 | 10/2019 | Kaminsky | |
| 2016/0260182 A1* | 9/2016 | Garman | G06Q 10/02 |
| 2017/0223049 A1 | 8/2017 | Kuperman et al. | |
| 2018/0350035 A1* | 12/2018 | Li | G06T 3/40 |
| 2019/0005389 A1* | 1/2019 | Glyman | G06N 3/08 |
| 2019/0102078 A1 | 4/2019 | Bhatt et al. | |
| 2019/0356684 A1 | 11/2019 | Sinha et al. | |
| 2021/0400065 A1* | 12/2021 | Herley | H04L 63/1441 |
| 2022/0301088 A1* | 9/2022 | Vemury | G06K 7/1095 |

FOREIGN PATENT DOCUMENTS

WO WO 2018/071881 4/2018

* cited by examiner

Primary Examiner — Daniel B Potratz
Assistant Examiner — Syed M Ahsan
(74) Attorney, Agent, or Firm — Lee & Hayes P.C.

(57) ABSTRACT

A system for limiting access to a digital resource based on detection of unauthorized scraping of the digital resource includes one or more processors configured to execute the instructions to detect, over a network, first data representing a plurality of first interactions by a client device with the digital resource hosted on a host system; extract, from the hardware storage device, second data representing a plurality of second interactions with digital resources, with the second interactions satisfy conditions for an interaction to be authorized; determine a confidence score based on comparing the first and second data, with the confidence score indicating a likelihood that an interaction is unauthorized; based on the determined confidence score indicating that the first interactions are unauthorized, detect, by one or more processing devices, unauthorized scraping of the digital resource; and limit access of the client device to the digital resource.

20 Claims, 5 Drawing Sheets

AUTOMATED BOT BLOCKING

TECHNICAL FIELD

The present disclosure generally relates to computerized systems, methods and computerized programs for detecting illegitimate scraping of a digital resource and limiting network access to the digital resource by the system sending access requests to perform the scraping.

BACKGROUND

Clients (e.g., online customers) often use digital resources (e.g., websites) or mobile applications to search, book, and manage services (e.g., book flights, hotels, cars, etc.). Nowadays, computer programs that mimic human behavior and perform human tasks have become more common. Certain computer programs, which are referred to as automated robots or "bots," are capable of automating tasks generally performed by humans, to gather private client related information from the digital resources by crawling through webpages to scan and gather keywords, links, text and other types of data.

SUMMARY

One aspect of the present disclosure is directed to a computer-implemented method for limiting access to a digital resource based on detection of unauthorized scraping of the webpage, comprising: detecting, over a network, first data representing a plurality of first interactions by a client device with the digital resource hosted on a host system; extracting, from a hardware storage device, second data representing a plurality of second interactions with digital resources, with the second interactions satisfying conditions for an interaction to be authorized; determining a confidence score based on comparing the first and second data, with the confidence score indicating a likelihood that an interaction is unauthorized; based on the determined confidence score indicating that the first interactions are unauthorized, detecting, by one or more processing devices, unauthorized scraping of the digital resource; and limiting access of the client device to the digital resource.

Another aspect of the present disclosure is directed to a system for limiting access to a digital resource based on detection of unauthorized scraping of the webpage, comprising: one or more memory devices storing instructions; and one or more processing devices in communication with one or more hardware storage devices configured to execute the instructions to: detect, over a network, first data representing a plurality of first interactions by a client device with the digital resource hosted on a host system; extract, from the hardware storage device, second data representing a plurality of second interactions with digital resources, with the second interactions satisfying conditions for an interaction to be authorized; determine a confidence score based on comparing the first and second data, with the confidence score indicating a likelihood that an interaction is unauthorized; detect unauthorized scraping of the digital resource based on the determined confidence score indicating that the first interactions are unauthorized; and limit access of the client device to the digital resource.

Yet another aspect of the present disclosure is directed to a non-transitory computer-readable medium storing instructions executable by one or more processors to perform operations for limiting access to a digital resource based on detection of unauthorized scraping of the webpage, the operations comprising: detecting, over a network, first data representing a plurality of first interactions by a client device with the digital resource hosted on a host system; extracting, from a hardware storage device, second data representing a plurality of second interactions with digital resources, with the second interactions satisfying conditions for an interaction to be authorized; determining a confidence score based on comparing the first and second data, with the confidence score indicating a likelihood that an interaction is unauthorized; based on the determined confidence score indicating that the first interactions are unauthorized, detecting, by one or more processing devices, unauthorized scraping of the digital resource; and limiting access of the client device to the digital resource.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation.

DETAILED DESCRIPTION

Figure 1:
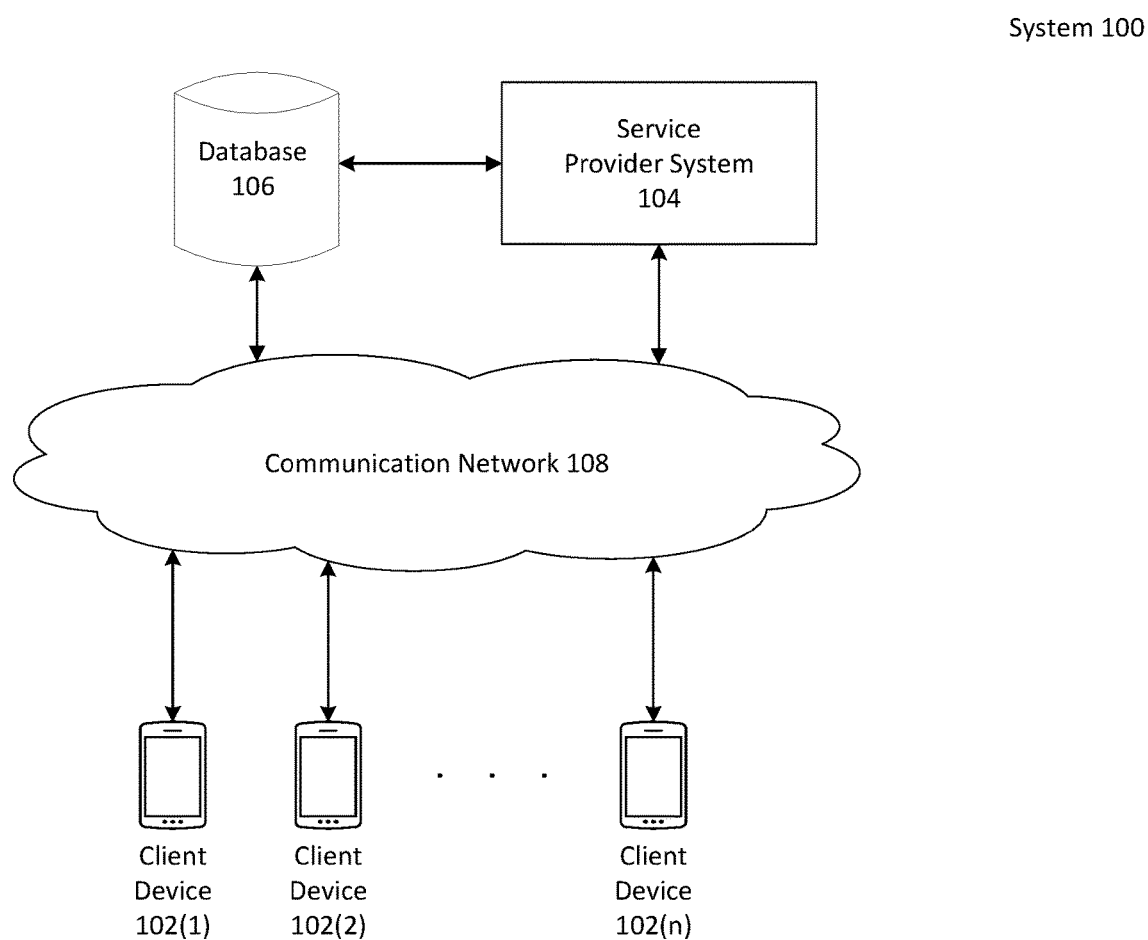
FIG. 1 is a schematic block diagram of an exemplary system, consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

While the following discussion is related to utilizing web based travel booking services, discussion of these services and environments are made by example only. It should be appreciated, however, that the present disclosure is not limited to these specific embodiments and details, which are exemplary only. It is further understood that one possessing ordinary skill in the art, in light of known systems and methods, would appreciate the use of the embodiments of the present disclosure for their intended purposes and benefits in any number of alternative embodiments, depending on specific design and other needs. The systems and methods discussed herein may be just as applicable in other environments that may benefit from the ability to determine unauthorized scraping of a digital resource (e.g., a website) from a client device and limiting access of the client device to the digital resource. Generally, scraping refers to extracting data from digital resources, such as a website. Scraping a website is referred to as web scraping. Web scraping software may access the World Wide Web directly using the Hypertext Transfer Protocol, or through a web browser. While web scraping can be done manually by a software user, the term typically refers to automated processes implemented using a bot or web crawler. It is a form of copying, in which specific data is gathered and copied from the web, typically into a central local database or spreadsheet, for later retrieval or analysis.

Bots can also masquerade as humans to gather information from the digital resources or automatically purchase large quantities of a desired commodities or service. Since a computer program can act automatically and more rapidly than a human, a computer program can compromise data for a large number of accounts or assist a single buyer in purchasing large quantities of a commodities or services in a short time span. Bots can be legitimate ("good bots") or malicious ("bad bots"). Good bots (e.g., chatbots, monitoring bots, etc.) perform helpful tasks for clients and digital service providers that aren't detrimental to either. Bad bots are often used by attackers to perform a variety of malicious activities, including distributed denial-of-service (DDoS) attacks, credential stuffing, gift and credit card fraud, spam relay, click fraud, intelligence harvesting, etc. A significant amount of the total web traffic is now made up of malicious bots or "bad" bots, which are responsible for many of the most serious security threats that online businesses are facing today. Bad bots pose an active threat to online service providers and harm them more than just financially. Bad bots create extra traffic on the service provider's network, slowing down access for legitimate users or clients, they can drive traffic away from a website, they can sabotage the service provider's reputation, they can collect sensitive client data, and other deceitful tactics. Because of these reasons, detecting bad bots and limiting their access should be a key security priority for any merchant or service provider with an online presence.

Some systems for bot detection use a Turing test (e.g., "CAPTCHA") for incoming requests. For example, these systems implement a test that requires a user of a client device attempting to access a web based application to identify words or objects in one or more images. While such tests can be effective at limiting robotic activity, these conventional systems are incapable of differentiating between good bots and bad bots. Now a days, bad bots are continuously improving at circumventing Turing tests. Over time, the original CAPTCHAs are becoming easy to solve for bots equipped with image processing software. To counter the growing capabilities of the bots, difficulty of the challenges is gradually increasing, ultimately escalating to visual processing challenges that are hard for real humans to solve. Most of the times when users are searching for airline prices, hotels, rental cars, etc., on a discount travel website and finally find some great deals, the users have to go through the process of solving difficult CAPTCHAs and may cause the human users to abandon the current website and look elsewhere. As disclosed in the embodiments below, it is more helpful if CAPTCHA challenges are used only when there is a possibility that a bot is accessing the website.

Additionally, some systems attempt to reduce the impact of robotic activity by limiting or excluding traffic from specific IP addresses. For example, conventional systems blocklist IP addresses that are sources of known illegitimate robotic activity. While blocklisting IP addresses of known sources of robotic activity effectively restricts access by the identified sources, regularly updating the lists results in high maintenance costs and provides inefficient detection by limiting the scope of the detecting only to known illegitimate robotic activity. Accordingly, current conventional systems are inefficient and unable to distinguish between good bots and bad bots. Thus, there is a need for detecting and limiting access to digital resources based on unauthorized scraping of the webpage.

In particular, there are many "good" bots browsing the Internet for various purposes, e.g., having content show up on a search. These "good" bots identify themselves to servers as being a bot while also adhering to rules set by the site operators, e.g., access limitations as defined in a robots.txt file.

As previously described, "bad" bots scrape sites to gain information (pricing data, reviews, other information; often for commercial purposes, e.g., resell to others for monitoring their own competitors) without identifying themselves as bots. Instead these bots explicitly try to hide by spoofing user agents, using VPNs, buying access to residential networks, pay commercial captcha solvers etc.

Not all "bad" bots are created equal and some of them can be blocked in very simple ways, e.g., by simply blocklisting their user agent (identifier of what browser they use), or by flagging obvious excessive access (rate limiting).

However, really sophisticated "bad" bots are hard to pick apart and described herein are techniques that classifies/scores if an access is "bad" using a statistical data approach.

As much as "bad" bots are mostly programmatic access, the techniques described herein are applied to heavily scaled human operations (e.g., a click farm in a low-cost country) as being a "bad" bot as well.

In order to classify access (e.g., as being either a good bot or a bad bot), the system described herein collects a number of data points for each access or series of accesses. Examples of these data points are shown below:

Device: Browser (product, vendor, version), device type, device characteristics (screen size, portrait vs. landscape), device settings (language preferences, installed plugins, installed fonts), and so forth.

Network: Speed classification, residential vs. corporate, registered operator, IP-based location, and so forth.

Access specifics: Brand, locale/market, language requested from our server, search details (e.g., routes, destinations, dates), and so forth.

Flow through digital resources being accessed: Sequence in which different parts (e.g., front door, result page) get accessed, timing in between accesses, and so forth.

Other data provided by a user: Email address, GPS location, search history, purchase history, and so forth.

In order to determine the legitimacy of an access request, the system compares this data against pre-defined criteria that are indicative of legitimate access. Example of this pre-defined criteria are provided below:

Popularity data, both global and within specific segments, e.g., "How common is Chrome™ version 46 in Spain?", "How common is Las Vegas SuperServers?"

Pre-specified criteria from actual operations:

What market/locale do users located in Switzerland usually use?

At what time do people from Spain usually access?

From what airports do people in Zurich usually search tickets?

How long does it usually take to run a search?

How many searches would a user normally run within a certain time period?

Performance data

Expected revenue, clicks etc. of any user, of any user in Spain, of any user with a particular mobile device etc.

If any of these tests give a strong indication of an access being not legit, the system prevents or restrict access by throttling, block or challenging a user device requesting access.

FIG. 1 is a block diagram of an exemplary system 100, for performing one or more operations consistent with disclosed embodiments. As illustrated in FIG. 1, system 100 may include a variety of systems, each of which may be connected to one another via one or more communication networks. Components of system 100 may include one or more computing devices (e.g., mobile phone(s), computer(s), server(s), etc.), memory storing data and/or software instructions (e.g., database(s), hardware storage device(s), memory device(s), etc.), and other known computing components. In some embodiments, the one or more computing devices may be configured to execute software instructions stored on one or more memory devices to perform one or more operations consistent with the disclosed embodiments.

In some embodiments, system 100 includes one or more client devices 102(1), . . . 102(n), one or more service provider systems 104, one or more databases 106, and a communication network 108. The components and arrangement of the components included in system 100 may vary. Thus, system 100 may include other components that perform or assist in the performance of one or more processes consistent with the disclosed embodiments.

Components of system 100 may be configured to limit access to a digital resource based on detection of unauthorized scraping of a webpage. Generally, limiting access refers to preventing access to a digital resources, rendering a graphical user interface with questions to be answered, throttling access or restricting access to only certain types of data, and so forth. A digital resource may include a website, a webpage, a mobile application, a web application, or any other type of application which may be accessed by a client via communication network. Examples of commonly-used web applications include web-mail, online retail sales, online banking, online travel booking websites, online auctions, etc. The digital resource may be hosted by a host system, herein referred to as service provider system 104. Service provider system 104 may be a website providing a variety of online services, for e.g., an e-commerce website, a financial services website, a website for booking, renting or reserving flights, rental cars, trains, stays (for e.g., hotels or other types of accommodation) or any other travel reservation related website or the like. As previously described, scraping of a webpage, may also be known as web scraping, web harvesting, or web data extraction and may include fetching data from the digital resource and extracting information from it. Unauthorized scraping of a digital resource may occur when malicious bots or "bad" bots fetch content from the digital resource with the intent of using it for purposes outside the service provider's control. Unauthorized scraping may be performed by "bad" bots or unauthorized bots or unauthorized computer implemented automated agents. Unauthorized scraping may include a range of harmful activities, for example, denial of service attacks, illegal data mining, online fraud, web-based hijacking, data theft, misuse of business logic from the website, unauthorized website scans, digital advertisement fraud, etc.

The client devices 102(1) . . . 102(n) may include, but are not limited to, computers, personal computers, portable computing devices including hand-held computers, personal digital assistants, mobile phones, and cellular telephones. Client device 102 may enable a user or a client associated with client device 102 to perform remote interactions or mobile transactions with service provider system 104. Client device 102 may be a computing device that executes computer applications and/or communication software, which allows client device 102 to communicate with service provider system 104 and other components via communication network 108, to generate and display content in interfaces via display device included in, or in communication with, client device 102. The disclosed embodiments are not limited to any particular configuration of client device 102. Client device 102 may include any arrangement of one or more computing devices configured to perform one or more operations consistent with disclosed embodiments. In some embodiments, client device 102 may include one or more software applications installed thereon, that enable client device 102 to communicate with service provider system 104 via communication network 108 and perform aspects of the disclosed methods. For example, client device 102 may connect to service provider system 104 through the use of browser software to access and receive information or perform other operations associated with an internet service provider. Client device 102 may host standard web browsers, operating systems, and/or custom applications software. By way of example, the operating systems may include Microsoft Windows™, Unix™, Linux™, Android™, Apple™ Mac OS operating systems, iOS™ Chrome OS, or other types of operating systems. Accordingly, disclosed embodiments may operate and function with computer systems running any type of operating system.

Service provider system 104 and client device 102 may be configured to communicate with each other over communication network 108. Communication network 108, herein referred to as network 108 may include, but is not limited to, wired networks, wireless networks, and combined wired and wireless networks. For example, network 108 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among various components of system 100. Network 106 may also include a public switched telephone network ("PSTN") and/or a wireless cellular network. Network 106 may be a secured network or unsecured network. In some embodiments, one or more components of system 100 may communicate directly through a dedicated communication link(s).

In some embodiments, service provider system 104 may be configured to limit access to a digital resource based on detection of unauthorized scraping of the webpage over a network. Service provider system 104 may be configured to receive client requests, for example, HTTP requests. Human based user requests may originate at client device 102 under the direction of a valid user/human. Bot based requests may originate at client device 102, initiated by computer implemented automated agents or "bot". As explained herein, service provider system 104 is capable of distinguishing between requests received from valid user, which may also be referred to as valid interactions, via client device 102 and requests received from a malicious user, which may also be referred to as invalid interactions via client device 102. In some embodiments, client requests may include requests related to travel or travel itinerary. For example, the requests may include requests including but not limited to booking, reserving or renting flights, airlines, trains, hotels, type of hotel rooms, cars, vacation packages, and so forth. The requests may further include additional travel-related information, including but not limited to a city of departure, a city of destination, departure date, return date, a class of travel, and so forth.

In some embodiments, the term valid interaction includes actions that are taken by or requests that are sent by people, human beings or valid users while operating client device 102. A valid request or an authorized request may be initiated by a human user while operating client device 102, i.e. when the user is engaged in a network session. A valid interaction may also be initiated by a "good bot" using client device 102. Good bots include automated computer programs that are beneficial to businesses as well as individuals. Good bots may include search engine crawlers, partner bots, social network bots, website monitoring bots, backlink checker bots, chat bots, aggregator bots, and so on. In some embodiments, the term invalid interaction includes actions that are taken by or requests that are sent by malicious automated computer agents or "bad" bots. An invalid request or an unauthorized request may be initiated by malicious automated computer agents or "bad" bots using client device 102. As described above, bad bots may send invalid requests to perform unauthorized scraping of the digital resource, which may include a range of harmful activities, for example, denial of service attacks, illegal data mining, online fraud, web-based hijacking, data theft, misuse of business logic from the website, unauthorized website scans, digital advertisement fraud, etc.

In some embodiments, service provider system 104 may be configured to limit access to a digital resource based on detection that the request originated as a result of unauthorized scraping of the webpage by a bad bot. In order to limit access to the digital resource, service provider system 104 may be capable of classifying the received request or series of requests received from client device 102. Service provider system 104 may acquire or detect multiple data points in real time, corresponding to each access request, each session, a series of access requests and a series of sessions. In some embodiments, the acquired data points represent a set of data obtained by the service provider system 104, from the received access request. Generally, a data point may be data, a data record, and so forth. Service provider 104 may then compare the acquired data points with behavioral attributes or service provider access criteria stored in database 106. Generally, database 106 is a hardware storage device that stores data records. Each data record has fields with values. The name of a field represents a behavioral attribute. The value of the field represents the value of the behavioral attribute. The system described herein parses the data records to identify fields corresponding to the type of detected data or data points. The identified fields are then parsed to identify values. Based on a comparison of the parsed values and the data points, the system classifies the access as either authorized or unauthorized, as described below. Behavioral attributes may include attributes collected for all valid, legitimate and authorized interactions of client device 102 with the digital resource recorded by service provider system 104 over a period of time. The period of time over which behavioral attributes may be collected may be several days, months or years. Behavioral attributes may include time attributes, location attributes, client device attributes, network attributes, client specific attributes, and business attributes collected by service provider system 104 for all valid, legitimate and authorized transactions over a period of time.

In some embodiments, the received request may be evaluated by service provider system 104 to acquire multiple data points related to the request. The received request may be evaluated by service provider system 104, in real time, using cookies, for e.g., session cookies or persistent cookies, fingerprinting using the features of client device 102, fingerprinting using browsers used on client device 102, web beacons, tracking pixels, and/or other information, for example, information extracted from a header or another portion of an HTTP request to obtain the data points.

In some embodiments, time attributes include but are not limited to a time at which a request or series of requests were received, a time zone associated with each request or series of requests, time spent by the client accessing the digital resource during one session or over a series of sessions, number of times the client accessed the digital resource within a predetermined time period, number of access requests received within a predetermined time period, time and date of travel requested by the client, travel schedule, departure date and time, return date and time, etc. The time attributes may also include, but are not limited to time at which and time duration for which main page of the digital resource was accessed, time at which and time duration for which a result page or any other page within the digital resource was accessed, time period in between multiple accesses requests, etc.

In some embodiments, location attributes include but are not limited to GPS coordinates client device or geographical location of the client from which a request was received, for e.g. a city or locale, number of requests received from a specific geographical location, intended travel destinations of the client, travel route preferences of the client, city of departure, a city of destination, airport or train station of departure, airport or train station of destination, etc.

In some embodiments, client device attributes include but are not limited to type of client device 102 used, for e.g., a mobile phone, a personal computer, etc. The client device attributes may further include but are not limited to type and version of an internet browsers used by client device 102, for e.g., Google Chrome™, Safari™, Edge™, etc. The client device attributes may further include but are not limited to type and version of operating system of client device 102, for e.g., Microsoft Windows™, Unix™, Linux™, Android™, iOS™ Mac OS™ etc. The client device attributes may further include but are not limited to characteristics of client device 102, for e.g., screen size, screen orientation, language preferences, plugins installed, fonts installed, email addresses associated with client device 102, virtual assistant associated with client device 102, for e.g., Siri™ Cortana™ or Google Assistant™, etc. The client device attributes may further include but are not limited to websites or native applications used by client device 102, for e.g., kayak.com™, hotels.com™, Hilton HHonors™, Airbnb™, etc.

In some embodiments, network attributes include but are not limited to speed of network connection used by client device 102, type of communication network associated with client device 102, for e.g., client device 102 may be associated with a residential network operator, or a commercial or corporate network operator, etc., alternatively client device 102 may operate using a cellular network, Wi-Fi™ network, a VPN, a private wireless network, a public wireless network and so on. In some embodiments, network attributes further include but are not limited to IP address associated with the incoming request, number of hops counts between source and destination IP addresses, cookies, tokens, session, and other network parameters associated with the incoming request, number of successful requests from multiple IP addresses, number of failed attempts from plurality of IP addresses, etc.

In some embodiments, client specific attributes include but are not limited to expected order in which the digital resource is accessed, number of clicks within a predetermined time period, for e.g., clicks per second. Client specific attributes may also include but are not limited to digital resources accessed within a predetermined time period, for e.g., number of hotels accessed per minute, number of external links accessed per minute, number of flight schedules viewed per minute, etc. Client specific attributes may further include but are not limited to, sign in credentials used by client device 102, number of users or clients signed in from a single location within a predetermined time period on client device 102, number of flights, hotels, cars, etc., viewed or booked during a single session or within a predetermined time period, number of webpages visited within a predetermined time period, number and type of performed by client using client device 102, search history of the client associated with client device 102, purchase history of the client associated with client device 102, travel history of the client associated with client device 102, etc.

In some embodiments, business attributes include but are not limited to expected revenue from a specific location, expected revenue from a single client associated with client device 102, expected revenue during a predetermined time period, for e.g. revenue expected during holiday season from United States, etc., travel insurance purchases, expected foreign travels, expected domestic travels, expected cancellation after booking a trip, expected first class and business class flight reservations, expected type of hotel reservations, and so on. Business attributes may also include ability or inability to access the digital resource from a specific location. For example, requiring that the user should search flights from the country in which the origin airport they search from is located.

In some embodiments, every single behavioral attribute is cross-referenced against all behavioral attributes by bad bot detection model 210 of service provider system 104 to determine a confidence score of every behavioral attribute. For example, the behavioral attribute "English language" may have a high confidence score when cross-referenced with behavioral attributes "United States" or "United Kingdom" or "iPhone™" but the same behavioral attribute "English language" may have a low confidence score when cross-referenced with behavioral attributes "Spain" or "China". The confidence score is calculated by bad bot detection model 210 based on stored behavioral attributes for previously authorized or valid interactions. Bad bot detection model 210, may compare the acquired data points to the extracted attributes and may determine a relative level of likelihood that the request corresponds to either a valid user or a bad bot. Confidence score may be categorized by bad bot detection model 210 as "high", "medium" or "low". When confidence score is categorized as "high", it may correspond to a relative level of likelihood or certainty indicating that request may have been originated by a human user or a good bot. When confidence score is categorized as "low", it may correspond to a relative level of likelihood or certainty indicating that request may have been originated as a result of unauthorized scraping by a malicious user or a bad bot. When confidence score is categorized as "medium", it may correspond to a relative level uncertainty indicating that bad bot detection model 210 may need to acquire additional data points from client device 102. In this case, service provider system 104 may present further challenges to perform additional verification, to client device 102. These challenges may include monitoring behavior, presenting a CAPTCHA, or partially blocking access. Service provider system 104 may obtain additional data points from the challenges and use the additional data points to perform a second comparison between the acquired additional data points and stored behavioral attributes.

In some embodiments, a previously authorized interaction may include behavioral attributes, for e.g., "time zone: EST", "browser: Safari™" and "device: iPhone™" Service provider system 106 may receive a request which may include data points for e.g., "location: Washington, DC", "device: iPhone™" and "browser: Safari™". Bad bot detection model 210, may extract at least the stored location attributes, and client device attributes. Bad bot detection model 210, may compare the acquired data points to the extracted attributes and may determine that "location: Washington, DC", "device: iPhone™" and "browser: Safari™" is a valid combination and may assign confidence score as "high". High confidence score may indicate that the request is initiated by a valid user, authorized user, or a good bot associated with client device 102. Based on this determination, service provider system 106 may allow client device 102 access to the digital resource.

In other embodiments, service provider system 104 may receive a request which may include data points for e.g., "location: Kathmandu, Nepal", "browser: Safari™" "browser version: 10", "departure airport: DCA" and "device: Samsung™". Bad bot detection model 210, may extract at least the stored location attributes, business attributes and client device attributes. Bad bot detection model 210, may compare the acquired data points to the extracted attributes and may determine that "browser: Safari™", "browser version: 10" cannot be used with and "device: Samsung™" and is therefore an invalid combination. Bad bot detection model 210 based on the extracted location attributes, and client device attributes may further determine that the request originated from "Kathmandu, Nepal", where "browser: Safari™" is not a commonly used browser. Bad bot detection model 210, may compare the acquired data points to the extracted attributes and may determine that "departure airport: DCA" cannot be used with "location: Kathmandu, Nepal" and is therefore an invalid combination. Based on this determination, bad bot detection model 210 may assign confidence score as "low". Low confidence score may indicate that the request is initiated by an invalid or unauthorized user or a bad bot associated with client device 102. Based on this determination, service provider system 104 may deny client device 102, access to the digital resource.

In some embodiments, service provider system 104 may receive a request from client device 102, to access a digital resource. Service provider system 104 may acquire data points from the received request. Data points acquired from the client request may indicate that the time between multiple clicks on a web-page is randomly varied with around 2-3 clicks per second. Bad bot detection model 210, may extract at least the stored client specific attributes. Bad bot detection model 210, may compare the acquired data points to the extracted attributes and may determine that 2-3 clicks per second is an average click speed for a human user. Based on this determination, bad bot detection model 210 may assign a "high" confidence score to the request and service provider system 106 may allow client device 102, access to the digital resource.

In some embodiments, service provider system 104 may receive a request from client device 102, to access a digital resource. Service provider system 104 may acquire data points from the received request. Data points acquired from the client request may indicate that the request is originating from Spain at 4:00 am local time. Bad bot detection model 210, may extract at least the stored location and time attributes. Bad bot detection model 210, may compare the acquired data points to the extracted attributes and may determine that legitimate users or clients in Spain more commonly access the digital resource between 7:00 am and 7:00 pm local time and do not access the digital resource at 4:00 am local time. Based on this determination, bad bot detection model 210 may assign a "low" confidence score to the request and service provider system 104 may determine that the request is being sent by a bad bot and may restrict or deny client device 102, access to the digital resource.

In some embodiments, service provider system 104 may receive a plurality of requests from client device(s) 102, to access a digital resource. The received plurality request may be five back to back requests. Service provider system 104 may acquire data points from the received stream of multiple requests. The acquired data points may indicate that the plurality of requests have multiple IP addresses and are coming from multiple GPS coordinates corresponding to various locations within a specific locale. Bad bot detection model 210, may extract at least the stored location and network attributes. Bad bot detection model 210, may compare the acquired data points to the extracted attributes and may determine that there is a travel agency located at those coordinates and request to access the digital resource from the acquired IP addresses, have previously been validated. Based on this determination, bad bot detection model 210 may assign a "high" confidence score to the request, determining that it did not originate from a bad bot and service provider system 104 may allow client device(s) 102, access to the digital resource.

In some embodiments, service provider system 104 may receive a request from client device 102, to access a digital resource. Service provider system 104 may acquire data points from the received request. Data points acquired from the client request may indicate that an order in which the access request was received corresponds to login page, booking page and log out page. The data points further indicate that the time spent at the booking page may in the range of a few hours. Bad bot detection model 210, may extract at least the stored time attributes and client specific attributes. Bad bot detection model 210, may compare the acquired data points to the extracted attributes and may determine that even though the order in which the digital resource is accessed may be correct, the time spent at the booking page in unnaturally long. Based on this determination, bad bot detection model 210 may assign a "low" confidence score to the request, determining that it may have originated from a bad bot and service provider system 104 may restrict client device 102, access to the digital resource.

In some embodiments, service provider system 104 may receive a request from client device 102, to access a digital resource, for e.g., an online shopping website with a brick and mortar store location. Service provider system 104 may acquire data points from the received request. Data points acquired from the client request may indicate the location of client device 102 and the inventory accessed by client device 102. Bad bot detection model 210, may extract at least the stored location attributes and client specific attributes. Bad bot detection model 210, may compare the acquired data points to the extracted attributes and may determine that the distance of client device 102 is next to the brick and mortar store location and there is a discrepancy between the inventory accessed by client device 102 and the inventory available at that location. Based on this determination, bad bot detection model 210 may assign a "low" confidence score to the request, determining that it may have originated from a bad bot and service provider system 104 may restrict client device 102, access to the digital resource.

In some embodiments, service provider system 104 may receive a request from client device 102, to access a digital resource. Service provider system 104 may acquire data points from the received request. Data points acquired from the client request may indicate that around 1000 users or clients are searching for tickets from ZRH or Zurich Airport to DOH or Hamad International Airport, Doha on a single day and the expected revenue may be around $1,500,000. Bad bot detection model 210, may extract at least the stored location attributes and business attributes. Bad bot detection model 210, may compare the acquired data points to the extracted attributes and may determine that the expected revenue generated for flights from ZRH to DOH is a very small amount as compared to the predicted revenue using the received data points. Bad bot detection model 210, may also determine that there are not enough flights from ZRH to DOH to accommodate on a single day. Based on this determination, bad bot detection model 210 may assign a "low" confidence score to the request, determining that it may have originated from a bad bot and service provider system 104 may restrict client device 102, access to the digital resource.

In some embodiments, service provider system 104 may determine unauthorized scraping of the digital resource by comparing acquired data points with one or more behavioral attributes. Service provider system 104 may receive a request to access a digital resource from client device 102, via network 108. Service provider system 102 may determine if the request can be authorized or not, using a bad bot detection model 210. Bad bot detection model 210 may determine a confidence score based on the comparison between acquired data points and stored behavioral attributes. In some embodiments, if the comparison yields a high confidence score, service provider system 104 may determine that the request is valid and authorize access to the digital resource. In other embodiments, if the comparison yields a low confidence score, service provider system 104 may determine that the request is invalid and restrict access to the digital resource.

In some embodiments, bad bot detection module 210 may need to perform additional verification to detect a potentially threatening request and to correctly determine if access is being requested by a bad bot. In such a situation, bad bot detection module 210 may yield a medium confidence score upon a first comparison between acquired data points and stored behavioral attributes. If the first comparison yields a medium confidence score, service provider system 104 may present further challenges to perform additional verification, to client device 102. These challenges may include monitoring behavior, presenting a CAPTCHA, or partially blocking access. Service provider system 104 may obtain additional data points from the challenges and use the additional data points to perform a second comparison between the acquired additional data points and stored behavioral attributes.

In some embodiments, monitoring behavior may include service provider system 104 monitors additional behavior for any malicious activity while the client associated with client device 102 moves through the digital resource. For example, the client may try to log in to an account for booking flights. If the client tries and fails three times, bad bot detection module 210 may yield a medium confidence score upon the first comparison. Service provider system 104 may extract additional data points to determine if the client is a bad bot. In this example, service provider system 104 may further monitor unsuccessful login attempts. Bad bot detection model 210 may perform a second comparison and determine a confidence score based on the second comparison between acquired additional data points and stored behavioral attributes. For example, in some embodiments, the client may be able to successfully login after three additional attempts. Service provider system 104 may extract additional data points and bad bot detection model 210 may use this result to perform a second comparison between the additional data points and the stored behavioral attributes. Bad bot detection model 210 may yield a high confidence score determining that the client is not a bad bot. Alternatively, in other embodiments, the client may be able to successfully login after more than fifty additional attempts. Bad bot detection model 210 may determine a confidence score based on the second comparison between acquired additional data points and stored behavioral attributes. In some embodiments, if the second comparison yields a high confidence score, service provider system 104 may determine that the request is valid and authorize access to the digital resource. In other embodiments, if the second comparison yields a low confidence score, service provider system 104 may determine that the request is invalid and restrict access to the digital resource.

In some embodiments, additional verification to detect a potentially threatening request may include presenting a CAPTCHA or a reCAPTCHA. Service provider system 104 may present the CAPTCHA or reCAPTCHA tests to the seemingly threatening client. CAPTCHA or reCAPTCHA tests may weed out automated bad bots that while allowing human users or good bots access upon completing the test. In some embodiments, the client may try to log in to an account for booking flights. The client may try to login and fail multiple times, for e.g., three times. In this situation, bad bot detection module 210 may yield a medium confidence score upon the first comparison. Based on this confidence score, service provider system 104 may then present a single CAPTCHA or a reCAPTCHA or a series of CAPTCHA or reCAPTCHA to the client. The client may respond to the CAPTCHA or reCAPTCHA and service provider system 104 may collect additional data points based on the response. In some embodiments the client may respond to the presented series of multiple CAPTCHAs or reCAPTCHAS within a time period. Service provider system 104 may acquire the time period as an additional data point. Bad bot detection module 210 may extract the stored behavioral attributes and compare the collected time period with the stored behavioral attributes. Bad bot detection module 210 may then perform a second comparison based on the additional data points, i.e., in this exemplary embodiment, the time period. In some embodiments, the time period may correspond to a speed that may be faster or slower than an actual human user. For e.g., responding to a series of CAPTCHAs or reCAPTCHAs by a digital signal within a time frame that may be faster compared to a real human user and may not be humanly possible. As another example, an outsourced human CAPTCHA solving service may be slower than a real user since the access request to the digital resource has to be queued when redirected to a CAPTCHA solving service. Based on these time period determinations, bad bot detection module 210 may yield a low confidence score and based on the low confidence score, service provider system 104 may determine that the request is invalid and restrict access to the digital resource. In other embodiments, the time period may correspond to normal human speed for e.g. responding to a series of ten CAPTCHAs or reCAPTCHAs in 1 minute. Bad bot detection module 210 may yield a high confidence score and based on the high confidence score, service provider system 104 may determine that the request is valid and allow access to the digital resource.

In some embodiments, additional verification to detect a potentially threatening request may include partially blocking access to the digital resource. For example, in some embodiments, the client may be able to login to a booking website after five unsuccessful attempts. Service provider system 104 may acquire data points based on all the login attempts. Bad bot detection module 210 may yield a medium confidence score upon a first comparison between acquired data points and stored behavioral attributes. In some embodiments, additional verification may include service provider system 104 partially blocking access to the digital resource, for example, blocking access to payment section of the digital resource. Service provider system 104 may continue monitoring client footprint and collecting additional data points while the client accesses other sections of the website. Bad bot detection model 210 may determine a confidence score based on the second comparison between acquired additional data points and stored behavioral attributes. In some embodiments, if the second comparison yields a high confidence score, service provider system 104 may determine that the request is valid and authorize access to the digital resource. In other embodiments, if the second comparison yields a low confidence score, service provider system 104 may determine that the request is invalid and restrict access to the digital resource.

In some embodiments, service provider system 104 may compile and store behavioral attributes for all valid, legitimate and authorized interactions of client device 102 with the digital resource, over a period of time, in database 106. Database 106 of system 100, may be communicatively coupled to service provider system(s) 104 and via network 108. Database 106 may include one or more memory devices that store information and are accessed and/or managed by one or more components of system 100. By way of example, database 106 may include Oracle™ databases, Sybase™ databases, or other relational databases or nonrelational databases, such as Hadoop sequence files, HBase, or Cassandra. The databases or other files may include, for example, data and information related to behavioral attributes for all valid, legitimate and authorized interactions of client device 102 with the digital resource, over a period of time. Database 106 is configured to store behavioral attributes including time attributes, client device attributes, location attributes, client specific attributes, network attributes and business attributes. Database 106 may include computing components (e.g., database management system, database server, etc.) configured to receive and process requests for data stored in memory devices of database 106 and to provide data from database 106. In some embodiments, service provider system 104 periodically updates database 106 with recent behavioral attributes for all valid, legitimate and authorized interactions of client device 102 with the digital resource.

Figure 2:
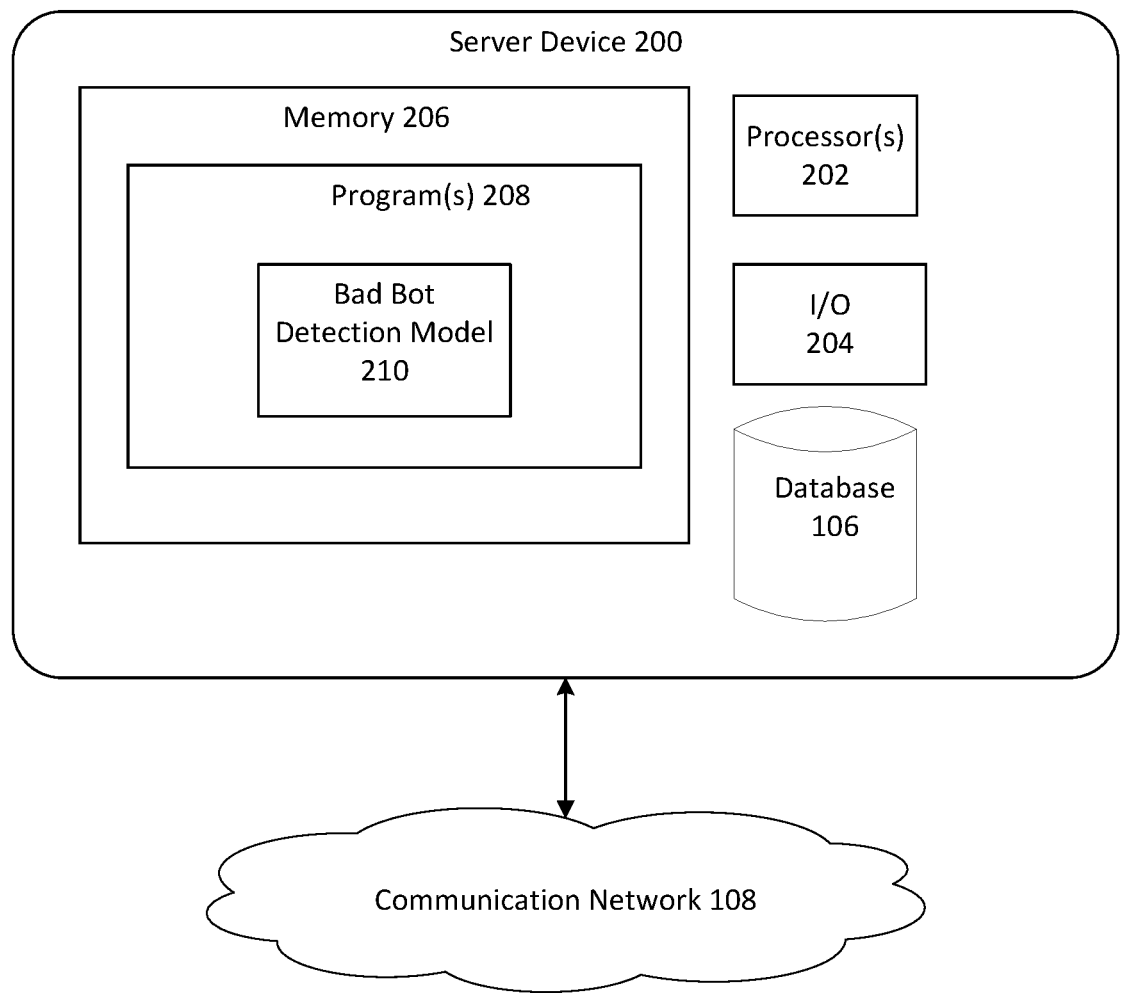
FIG. 2 is a block diagram of an exemplary server system, consistent with disclosed embodiments.

FIG. 2 shows an exemplary server 200 consistent with the disclosed embodiments. Variations of exemplary server 200 may constitute one or more components of service provider system 104. In one embodiment, server 200 includes one or more processors 202, one or more input/output (I/O) devices 204, and one or more memories 206. In some embodiments, server 200 may be a part of service provider system 104. In some embodiments, server 200 may take the form of a specially programmed server or computing system used by service provider system 104. In some embodiments, server 200 may be configured as an apparatus, embedded system, dedicated circuit, and the like based on the storage, execution, and/or implementation of the software instructions that perform one or more operations consistent with the disclosed embodiments. Processor 202 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of system 100.

Memory 206 may include one or more storage devices configured to store instructions used by processor 202 to perform functions related to disclosed embodiments. For example, memory 206 may be configured with one or more software instructions, such as program(s) 208 that may perform one or more operations when executed by processor 202. The disclosed embodiments are not limited to separate programs or computers configured to perform dedicated tasks. For example, memory 206 may include a single program 208 that performs the functions of system 100, or program 208 may comprise multiple programs. In certain embodiments, memory 206 may store sets of instructions or programs 208 for limiting access to the digital resource based on detection of unauthorized scraping of the digital resource. These sets of instructions may be executed by processor 202 to perform communication and/or processes consistent with disclosed embodiments. In certain embodiments, when server 200 constitutes one or more of the components of service provider system 104, memory 206 includes a bad bot detection model 210, which may determine a confidence score based on the comparison between acquired data points and stored behavioral attributes.

Server 200 may also be communicatively coupled to one or more database(s) 106. In one aspect, server 200 may include database 106. Alternatively, database 106 may be located remotely from server 200 and server 200 may be communicatively coupled to database(s) 106 through network 108.

In some embodiments, bad bot detection model 210 may be one of the set of instructions or programs 208 stored in memory 206, which when executed by processor 202 to perform processes for limiting access to the digital resource based on detection of unauthorized scraping of the digital resource.

Figure 3:
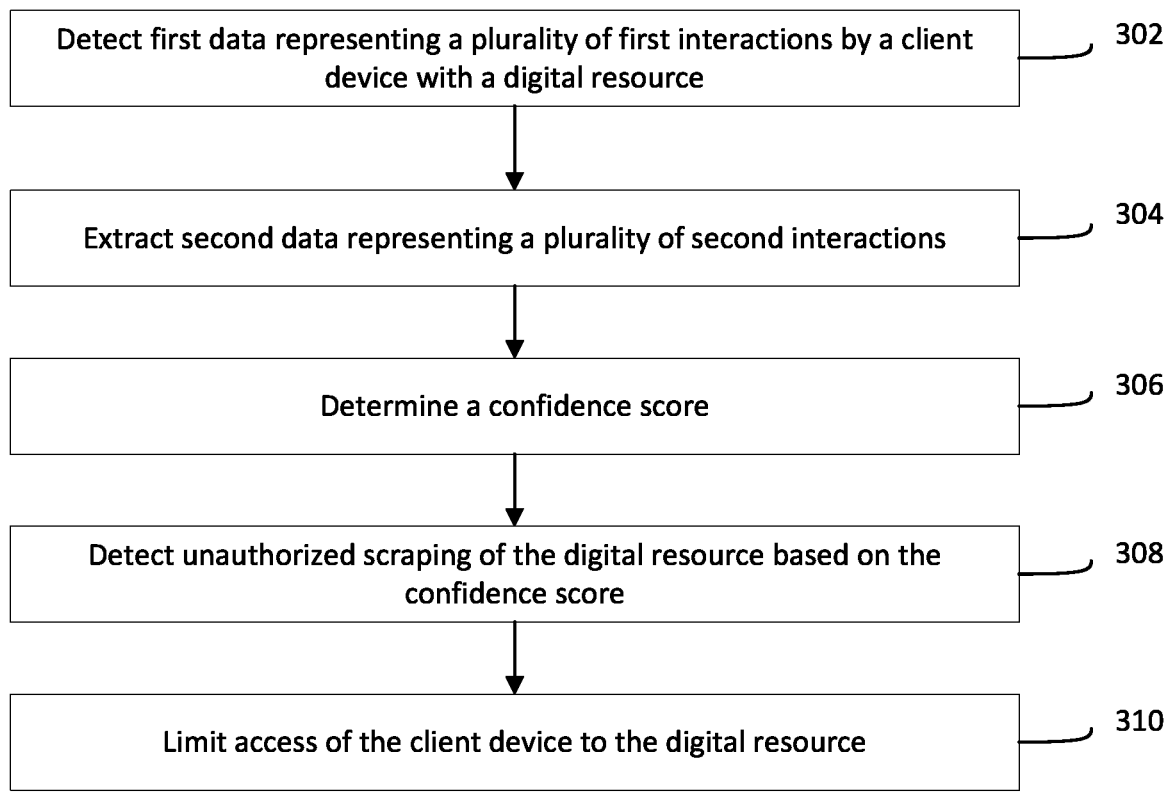
FIG. 3 is a flowchart of an exemplary process, consistent with disclosed embodiments.

FIG. 3 is a flowchart of an exemplary process 300 for limiting access to a digital resource on detection of unauthorized scraping of the digital resource consistent with the disclosed embodiments. In certain aspects, server 200 may be configured to execute software instructions that perform one or more of the operations of process 300.

In accordance with process 300, service provider system 104 detects first data representing a plurality of first interactions by a client device with a digital resource hosted on a host system (Step 302). In some embodiments, plurality of first interactions may correspond to one or more requests received by service provider system 104 to access a digital resource. The digital resource may be a website or a webpage or the like, hosted on the host system. In some embodiments, the host system corresponds to service provider system 104. Service provider system may evaluate the one or more requests received, and acquire a set of data points corresponding to the one or more requests. In some embodiments, the first data corresponds to acquired or detected data points corresponding to one or more first interactions by the client device with the digital resource. The received request may be evaluated by service provider system 104, in real time, using cookies, for e.g., session cookies or persistent cookies, fingerprinting using the features of client device 102, fingerprinting using browsers used on client device 102, web beacons, tracking pixels, and/or other information, for example, information extracted from a header or another portion of an HTTP request to obtain the data points.

At 304, service provider system 104 extracts second data representing a plurality of second interactions. In some embodiments, the second data may correspond to the behavioral attributes and plurality of second interactions may correspond the valid, legitimate and authorized interactions of client device 102 with the digital resource recorded by service provider system 104 over a period of time. The period of time over which the behavioral attributes may be collected may be several days, months or years. Behavioral attributes may include time attributes, location attributes, client device attributes, network attributes, client specific attributes, and business attributes collected by service provider system 104 for all valid, legitimate and authorized transactions over a period of time.

At 306, bad bot detection model 210 (also referred to herein as engine 210) determines a confidence score. The confidence score is calculated by bad bot detection model 210 based on stored behavioral attributes for previously authorized or valid interactions. Bad bot detection model 210, may compare the acquired data points to the extracted attributes and may determine a relative level of likelihood that the request corresponds to either a valid user or a bad bot. Confidence score may be categorized by bad bot detection model 210 as "high" or "low", as previously described.

In particular, engine 210 includes a series of instructions and executable logic that compares the parsed values, previously described, to the detected data points (e.g., to the values in the detected data points). Engine 210 determines a level of similarity between the parsed values and the values of stored behavioral attributes. For example, engine 210 determines if the values match or if the values are a variant of each other, in which case there would be a threshold level of similarity. When the determined level of similarity meets a threshold level, engine 210 classifies the detected data point as authorized or legitimate. When the number of detected data points classified as authorized reaches a threshold amount, the system determines that the access is authorized or the access is coming from a good bot.

When the determined level of similarity fails to satisfy the threshold level, engine 210 classifies the detected data point as unauthorized or illegitimate. When the number of detected data points classified as unauthorized reaches a threshold amount, the system determines that the access is unauthorized and that access should be limited. The foregoing operations can be implemented in numerous other manners and by other mechanisms and workflows.

At 308, bad bot detection model 210 detects unauthorized scraping of the digital resource based on the confidence score. When confidence score is categorized as "high", it may correspond to a relative level of likelihood or certainty indicating that request may have been originated by a human user or a good bot. When confidence score is categorized as "low", it may correspond to a relative level of likelihood or certainty indicating that request may have originated as a result of unauthorized scraping by a malicious user or a bad bot, as previously described. Accordingly, when the confidence score is categorized as "low", bad bot detection model 210 may determine that the received request is from a bad bot or a malicious automated agent for unauthorized scraping of the digital resource.

At 310, service provider system limits access of the client device to the digital resource. As previously described, if the comparison yields a high confidence score, service provider system 104 may determine that the request is valid and authorize access to the digital resource. In other embodiments, if the comparison yields a low confidence score, service provider system 104 may determine that the request is invalid and restrict or limit access to the digital resource.

Figure 4:
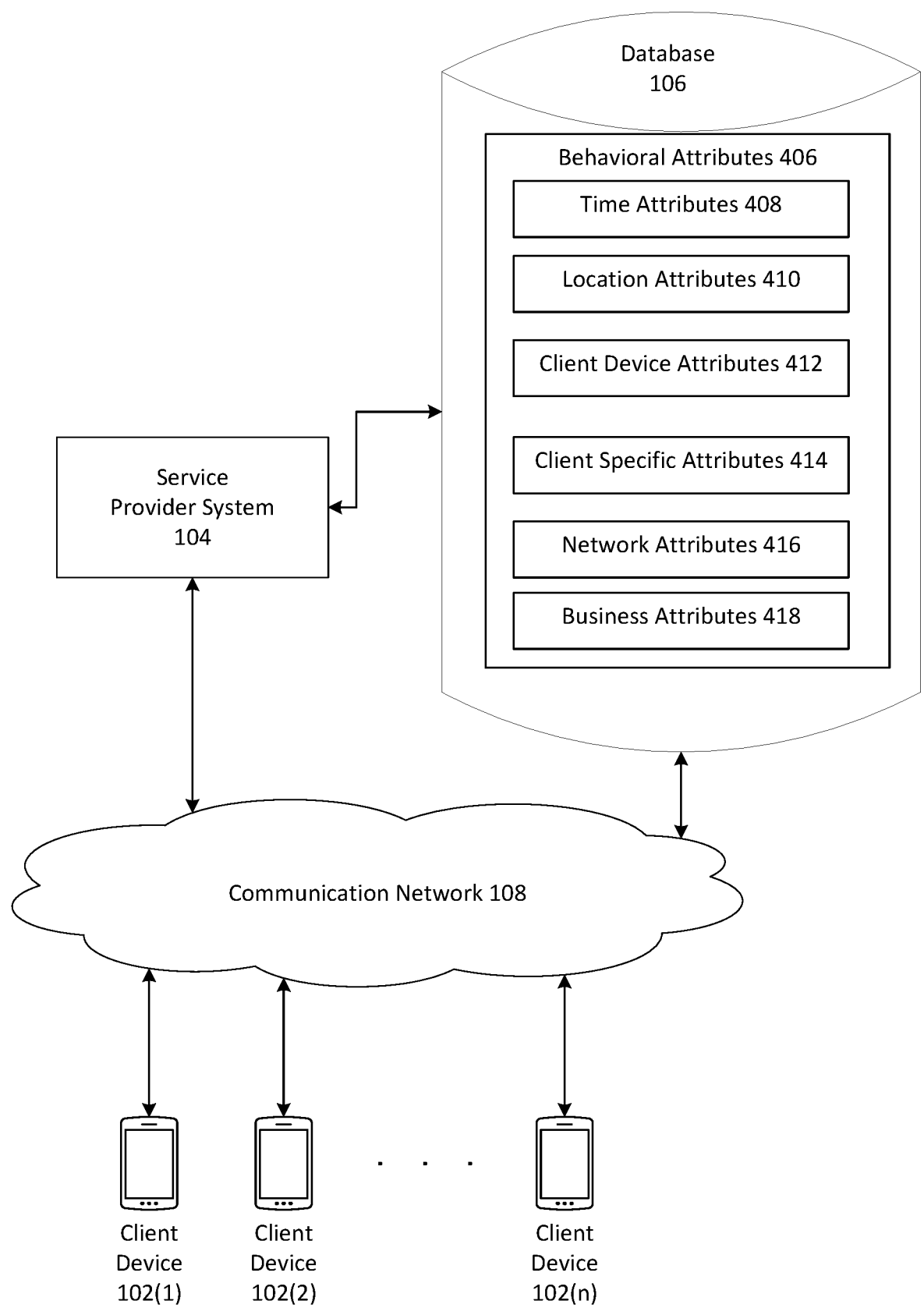
FIG. 4 is a block diagram of an exemplary system, consistent with disclosed embodiments.

FIG. 4 is a block diagram of an exemplary system 100, including exemplary database 106, for performing one or more operations consistent with disclosed embodiments. As illustrated in FIG. 4, database 106 of system 100, may be communicatively coupled to service provider system(s) 104 and via network 108. Database 106 may include one or more memory devices that store information and are accessed and/or managed by one or more components of system 100. Database 106 may store behavioral attributes 406. Behavioral attributes 406 may include time attributes 408, location attributes 410, client device attributes 412, client specific attributes 414, network attributes 416 and business attributes 418, collected for all valid, legitimate and authorized interactions of client device 102 with the digital resource recorded by service provider system 104 over a period of time. The period of time over which behavioral attributes may be collected may be several days, months or years. In some embodiments, behavioral attributes 406 including time attributes 408, location attributes 410, client device attributes 412, client specific attributes 414, network attributes 416 and business attributes 418, may be iteratively updated every time service provider system 104 determines that the interaction from the client device 102 is a valid or authorized interaction.

Figure 5A:
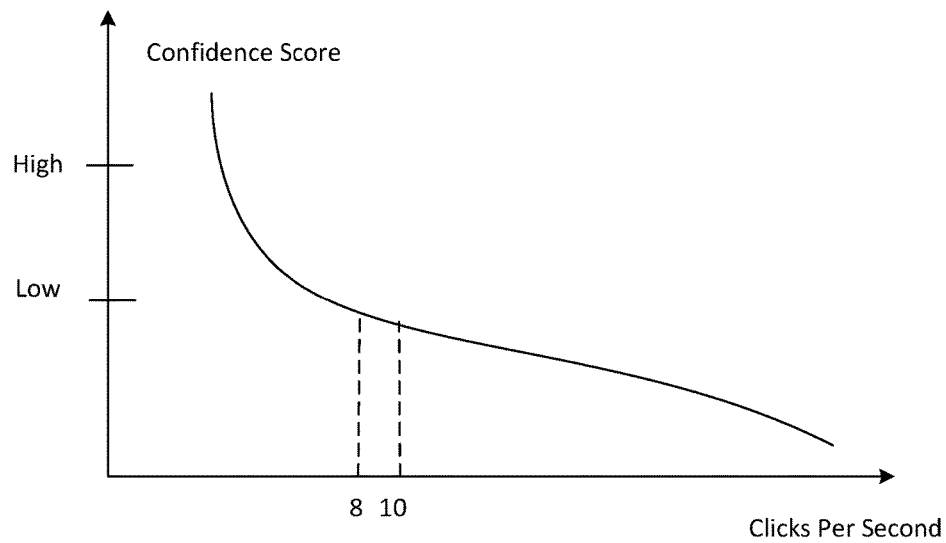
FIG. 5A is a graphical representation, consistent with disclosed embodiments.
Figure 5B:
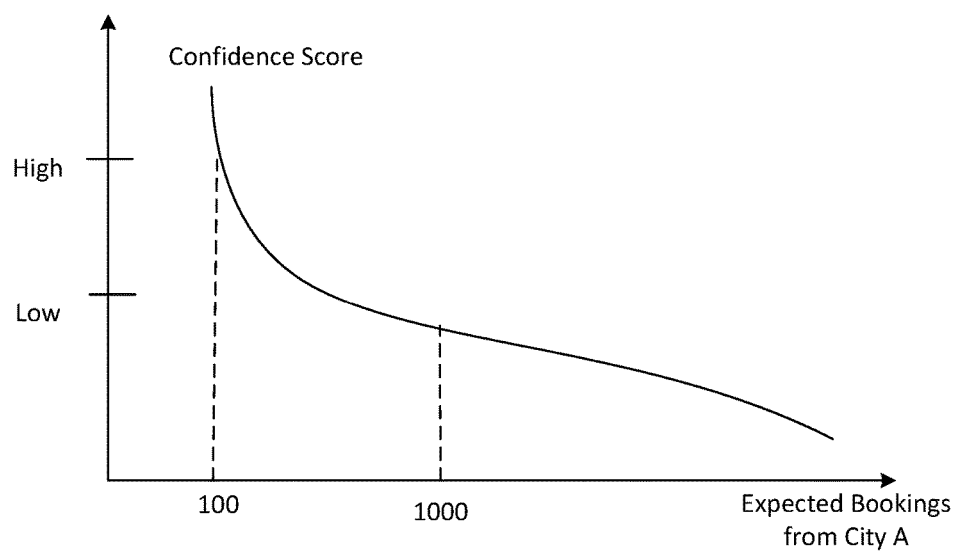
FIG. 5B is a graphical representation, consistent with disclosed embodiments.

FIG. 5A and FIG. 5B show graphical representations, of a plurality of session where service provider system 104 receives plurality of client interactions over network 108. The graph represents confidence score based on an exemplary attribute. FIG. 5A, shows the exemplary behavioral attribute "clicks per second". In an exemplary embodiment, service provider system 104 may receive a request from client device 102, to access a digital resource. Service provider system 104 may acquire data points from the received request. Data points acquired from the client request may indicate that the time between multiple clicks on a web-page is randomly varied with around 9-10 clicks per second. Bad bot detection model 210, may extract at least the stored client specific attributes. Bad bot detection model 210, may compare the acquired data points to the extracted attributes and may determine that 9-10 clicks per second is an not an average click speed for a human user. Based on this determination, bad bot detection model 210 may assign a "low" confidence score to the request and service provider system 104 may restrict client device 102, access to the digital resource.

FIG. 5B, shows the exemplary behavioral attribute "expected bookings from city A". In an exemplary embodiment, service provider system 104 may receive a request from client device 102, to access a digital resource. Service provider system 104 may acquire data points from the received request. Bad bot detection model 210, may extract at least the stored location specific attributes from database 106. Bad bot detection model 210, may compare the acquired data points to the extracted attributes and may determine that when the expected bookings originating from city A is 100, the confidence score is high and when the expected bookings originating from city A is 1000, the confidence score is low, as shown in the graph of FIG. 5B.

The techniques described herein provide numerous advantages, including, e.g., increased accuracy of precision in detecting bad bots—those bots that are performing unauthorized scraping of digital resources, e.g., webpages. This accuracy of precision is increased, relative to the accuracy of precision in detecting bad bots by simply blocklisting their user agent (identifier of what browser they use), or by flagging obvious excessive access (rate limiting).

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

The techniques described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The instructions and operations performed by engine 210 can be implemented as data structures stored in a computer readable medium or other organized data conforming to a data model stored in a data repository. The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

The invention claimed is:

1. A computer-implemented method for limiting access to a digital resource based on detection of unauthorized scraping of the digital resource, comprising:
   detecting, over a network, first data representing a plurality of first interactions by a client device with the digital resource hosted on a host system;
   extracting, from a hardware storage device, second data representing a plurality of second interactions with digital resources, with the second interactions satisfying conditions for an interaction to be authorized;
   determining a confidence score based on comparing the first data and the second data, with a high confidence score indicating a likelihood that the interaction is authorized, a low confidence score indicating a likelihood that an interaction is unauthorized, and a medium confidence score indicating additional verification is required, each type of confidence score having one or more corresponding confidence score thresholds;
   responsive to determining that the confidence score satisfies a medium confidence score threshold, obtaining third data representing a plurality of third interactions by the client device the plurality of third interactions comprising a) one or more interactions with at least one of a CAPTCHA or the digital resource and, b) interactions not included in the plurality of first interactions;
   determining a second confidence score using the third data and the second data;
   responsive to determining that the second confidence score satisfies a low confidence score threshold indicating that the third interactions are unauthorized, detecting, by one or more processing devices, unauthorized scraping of the digital resource; and
   limiting access of the client device to the digital resource.

2. The method of claim 1, wherein the plurality of first interactions include receiving a plurality of requests, by the client device, associated with a travel reservation.

3. The method of claim 1, wherein the second data representing the plurality of second interactions with digital resources include at least one of time attributes, location attributes, device attributes, client specific attributes, network attributes, or business attributes.

4. The method of claim 3, wherein the second data representing the plurality of second interactions with digital resources include time attributes, wherein the time attributes include at least one of session duration, time zone of the plurality of first interactions, time spent interacting with the digital resource, number of times the digital resource was accessed within a predetermined time period, number of travel requests received within a predetermined time period or travel schedule data.

5. The method of claim 3, wherein the second data representing the plurality of second interactions with digital resources include location attributes, wherein the location attributes include geographical location of a source of the plurality of first interactions, number of interactions received from a geographical location, travel route data, and travel itinerary data.

6. The method of claim 3, wherein the second data representing the plurality of second interactions with digital resources include device attributes, wherein the device attributes include at least one of type of the client device, to type and version of an internet browsers installed on the client device or type and version of operating system installed on the client device.

7. The method of claim 1, wherein the second data representing the plurality of second interactions with digital resources include client specific attributes, wherein the client specific attributes include at least one of number of clicks within a predetermined time period, number of external links accessed within a predetermined time period, sign in credentials of the client device, or search history of the client device.

8. The method of claim 1, wherein the second data representing the plurality of second interactions with digital resources include network attributes, wherein the network attributes include at least one of speed of network connection used by the client device, or type of communication network used the client device.

9. The method of claim 1, wherein the second data representing the plurality of second interactions with digital resources include business attributes, wherein the business attributes include at least one of revenue generated, estimated travel requests, or currency selected.

10. The method of claim 1, wherein the first data comprises an order in which the client device accessed resources hosted on the host system and time taken to access the resources.

11. A system for limiting access to a digital resource based on detection of unauthorized scraping of the digital resource, the system comprising:
   one or more memory devices storing instructions; and
   one or more processors in communication with one or more hardware storage devices configured to execute the instructions to:
      detect, over a network, first data representing a plurality of first interactions by a client device with the digital resource hosted on a host system;
      extract, from the hardware storage device, second data representing a plurality of second interactions with digital resources, with the second interactions satisfy conditions for an interaction to be authorized;
      determine a confidence score based on comparing the first data and the second data, with a high confidence score indicating a likelihood that the interaction is authorized, a low confidence score indicating a likelihood that an interaction is unauthorized, and a medium confidence score indicating additional verification is required, each type of confidence score having one or more corresponding confidence score thresholds;
      responsive to determining that the confidence score corresponds to a medium confidence score, obtaining third data representing a plurality of third interactions by the client device, the plurality of third interactions comprising a) one or more interactions with at least one of a CAPTCHA or the digital resource and, b) interactions not included in the plurality of first interactions;
      determining a second confidence score using the third data and the second data;
      responsive to determining that the second confidence score satisfies a low confidence score threshold indicating that the third interactions are unauthorized, detect, by one or more processing devices, unauthorized scraping of the digital resource; and limit access of the client device to the digital resource.

12. The system of claim 11, wherein the plurality of first interactions include receiving a plurality of requests, by the client device, associated with a travel reservation.

13. The system of claim 11, wherein second data representing the plurality of second interactions with digital resources include at least one of time attributes, location attributes, device attributes, client specific attributes, network attributes, or business attributes.

14. The system of claim 13, wherein the second data representing the plurality of second interactions with digital resources include time attributes, wherein the time attributes include at least one of session duration, time zone of the plurality of first interactions, time spent interacting with the digital resource, number of times the digital resource was accessed within a predetermined time period, number of travel requests received within a predetermined time period or travel schedule data.

15. The system of claim 13, wherein the second data representing the plurality of second interactions with digital resources include location attributes, wherein the location attributes include geographical location of a source of the plurality of first interactions, number of interactions received from a geographical location, travel route data, and travel itinerary data.

16. The system of claim 13, wherein the second data representing the plurality of second interactions with digital resources include device attributes, wherein the device attributes include at least one of type of the client device, to type and version of an internet browsers installed on the client device or type and version of operating system installed on the client device.

17. The system of claim 13, wherein the second data representing the plurality of second interactions with digital resources include client specific attributes, wherein the client specific attributes include at least one of number of clicks within a predetermined time period, number of external links accessed within a predetermined time period, sign in credentials of the client device, or search history of the client device.

18. The system of claim 13, wherein the second data representing the plurality of second interactions with digital resources include network attributes, wherein the network attributes include at least one of speed of network connection used by the client device, or type of communication network used the client device.

19. The system of claim 13, wherein the second data representing the plurality of second interactions with digital resources include business attributes, wherein the business attributes include at least one of revenue generated, estimated travel requests, or currency selected.

20. A non-transitory computer-readable medium storing instructions executable by one or more processors to perform operations for limiting access to a digital resource based on detection of unauthorized scraping of the digital resource, the operations comprising:

detecting, over a network, first data representing a plurality of first interactions by a client device with the digital resource hosted on a host system;

extracting, from a hardware storage device, second data representing a plurality of second interactions with digital resources, with the second interactions satisfying conditions for an interaction to be authorized;

determining a confidence score based on comparing the first data and the second data, with a high confidence score indicating a likelihood that the interaction is authorized, a low confidence score indicating a likelihood that an interaction is unauthorized, and a medium confidence score indicating additional verification is required, each type of confidence score having one or more corresponding confidence score thresholds;

responsive to determining that the confidence score corresponds to a medium confidence score, obtaining third data representing a plurality of third interactions by the client device, the plurality of third interactions comprising a) one or more interactions with at least one of a CAPTCHA or the digital resource and, b) interactions not included in the plurality of first interactions;

determining a second confidence score based on comparing the third data and the second data;

responsive to determining that the second confidence score satisfies a low confidence score threshold indicating that the third interactions are unauthorized, detecting, by one or more processing devices, unauthorized scraping of the digital resource; and limiting access of the client device to the digital resource.

* * * * *